United States Patent [19]

Benjo

[11] 4,175,337
[45] Nov. 27, 1979

[54] APPARATUS FOR ASSISTING THE UNDERSTANDING OF ELECTRO-CARDIOGRAPHY AND VECTOR-CARDIOGRAPHY

[76] Inventor: Cezar Benjo, Rua Santa Clara No. 50, sala 808, Rio de Janeiro, Brazil

[21] Appl. No.: 913,168

[22] Filed: Jun. 6, 1978

[51] Int. Cl.$^2$ .............................................. G09B 23/28
[52] U.S. Cl. ............................................ 35/17; 35/58
[58] Field of Search ............................ 35/7 A, 17, 58; 128/2.06 R, 2.06 V

[56] References Cited

U.S. PATENT DOCUMENTS

| | | | |
|---|---|---|---|
| 2,714,380 | 8/1955 | Freshman | 128/2.06 V |
| 3,339,297 | 9/1967 | Stinn | 35/7 A X |
| 3,343,279 | 9/1967 | Elkins | 35/58 X |
| 3,915,457 | 10/1975 | Casey | 35/58 X |
| 4,091,549 | 5/1978 | Driller | 35/17 |

*Primary Examiner*—Harland S. Skogquist

*Attorney, Agent, or Firm*—Sughrue, Rothwell, Mion, Zinn and Macpeak

[57] ABSTRACT

An apparatus for teaching electro-cardiography and vector-cardiography comprises, in its preferred form, a portable box having a first mirror attached to the box body and a second mirror attached to the inside of the lid so as to be normal to the first mirror when the lid is open. The first and second mirrors are marked to indicate the electrode leads on a patient in the horizontal and frontal planes, respectively. Between the mirrors is a loop-mounting means for mounting therebetween one of a series of vector-cardiographic loops representative of normal and pathological heart conditions. Orthogonal projections of any particular loop are reflected by the mirrors and such reflections can be used to assist in teaching electro-cardiography. A third Sagittal plane mirror may also be mounted, when the box is open, in orthogonal relation to the first and second mirrors for the teaching of vector-cardiography.

13 Claims, 1 Drawing Figure

U.S. Patent
Nov. 27, 1979
4,175,337
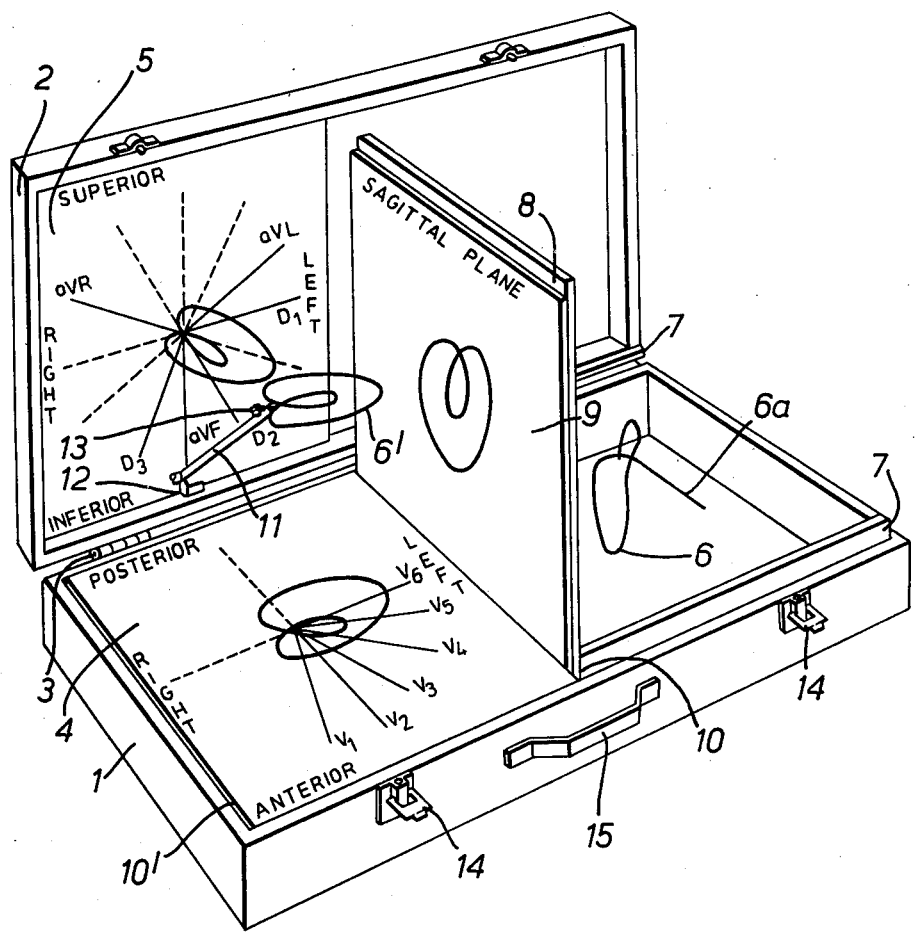

APPARATUS FOR ASSISTING THE UNDERSTANDING OF ELECTRO-CARDIOGRAPHY AND VECTOR-CARDIOGRAPHY

BACKGROUND OF THE INVENTION

The Field of the Invention

The present invention relates to an apparatus for assisting the understanding of electro-cardiography and vector-cardiography. A serious problem encountered in medical schools is that of transmitting a clear understanding of logical and deductive electro-cardiography and vector-cardiography. One of the reasons is that the students who usually have little knowledge either of mathematics or of electricity cannot relate electro-cardiograms to the actual state of the patient's heart, nor even to the positioning of the electrodes on the patient's body. Various teaching methods are used, but serious difficulties are encountered due to the fact that the electrical state of the heart considered in electro- and vector-cardiography is represented in two and three different orthogonal planes, respectively, whereas the average teacher finds difficulty in illustrating this on a blackboard, by the projection of slides or the like.

Vector-cardiographic loops are already known to be made of wire so as to assist in visual demonstrations to classes of medical students, but the teaching processes are still found to be slow and generally inadequate. The result is that many specialized competent doctors still have an incomplete understanding of the electro-cardiogram and vector-cardiogram. It is therefore an object of the present invention to provide a simple apparatus which will assist the teaching of electro-cardiography and vector-cardiography.

SUMMARY OF INVENTION

According to the present invention, such an apparatus comprises first and second mirrors for placement in substantially horizontal and vertical planes representative, respectively, of the horizontal and frontal planes of electrode placement on a patient, said first horizontal mirror being marked with lines representing the leads of the principal horizontal electrodes on the patient's body, said lines emanating from a generally central point of said first mirror, and said second frontal plane mirror being marked with lines emanating from a generally central point of said second mirror and indicating the leads of the frontal plane electrodes on the patient's body; a series of standard three dimensional vector-cardiographic loops representative of normal and pathological heart conditions; a support portion on each said loop, and support means adopted for receiving said support portion of a selected one of same loops between said mirrors substantially in a position in which an observer may view the reflection of the projection of said loop in either one of said first and second mirrors with the starting point of said loop coinciding with said central points of said mirrors.

Preferably the apparatus is also provided with a third mirror for placement in a plane orthogonal to said first and second mirrors, said third mirror being representative of the Sagittal plane to permit vision of the projection of said selected loop in said Sagittal plane. The apparatus of the present invention may comprise a box having a box body and a lid hingedly connected thereto, said first and second mirrors being fixed, respectively, to said box body and said lid so as to become substantially normal to each other on opening said box.

BRIEF DESCRIPTION OF THE DRAWING

The invention will now be described in greater detail, by way of example, with reference to the single FIGURE of the accompanying drawing which shows a perspective view of a preferred embodiment of the apparatus according to the present invention.

DETAILED DESCRIPTION OF THE PREFERRED EMBODIMENT

The single FIGURE of the drawings is a perspective view of a kit constructed in accordance with the present invention for assisting the teaching and understanding of electro-cardiography and vector-cardiography. This preferred embodiment of the invention comprises a box in the form of a body 1, and a lid 2 hinged to the base by hinges 3. When the box is in the open position, as illustrated in the drawing, lid 2 remains substantially vertical.

Body 1 of the box is separated in two halves. The left-hand half, as seen in the figure, supports a horizontal glass, plastic or metal mirror 4, which will be described later. Equally, the left-hand side of the inner surface of lid 2 supports a second mirror 5, also to be described later. The right hand half of body 1 of the box is formed as a hollow container for storage of a series of vector cardiographic loops which are an integral part of the kit. One of these loops, representing left ventricular hypertrophy is illustrated within the storage space, and indicated by the reference number 6. Each loop has a support portion 6a.

The front and rear top edges of the storage space are provided with horizontal parallel guides or channels 7 adapted slidingly to receive a cover 8, which also serves as a backing plate for a mirror 9. Guides 7 terminates slightly short of the right-hand edge of horizontal mirror 4 so as to define a slot 10 therebetween, which permits the vertical placement of said cover 8 and mirror 9 in orthogonal relation to horizontal and vertical mirrors 4 and 5, precisely as illustrated in the drawing.

Equally, the left-hand edge of horizontal mirror 4 terminates slightly short of the inside vertical surface of the left-hand end of box 1. This defines a second slot 10' so that plate 8 with Sagittal plane mirror 9 can also be fitted vertically at the left side of the box with the mirror facing inwards.

A thin tube 11 is hinged at 12 to the lower edge of box lid 2 in such a way that the tube may be pivoted in a vertical plane passing through the centers of mirrors 4 and 5, and parallel to mirror 9. In the region of the free end of tube 11 is a fixing screw 13 so that a vector loop, such as loop 6', may have its support portion 6a received within tube 11 and be fixed in position by screw 13. As can be seen from the drawing, each of the three mirrors 4, 5 and 9 are suitably marked in accordance with the reflection of loop 6' to be observed therein. Mirror 4 is marked to represent the six leads $V_1$, $V_2$, $V_3$, $V_4$, $V_5$ and $V_6$ of the principal electrodes placed on the patient's body in the horizontal plane. Further to assist the students, the mirror is marked to indicate the left and right sides as well as left posterior, left anterior, right posterior, and right anterior. Equally, vertical mirror 5 is marked to represent the six leads corresponding to the frontal plane electrodes placed on the patient's body. As will be seen and as is conventional, these are marked $D_1$, $D_2$, $D_3$, aVR, aVL and aVF. This mirror is also marked left and right, superior and inferior to assist the students' understanding. Finally, the third mirror 9 will represent the Sagittal plane as seen in vector-cardiogram traces on an oscilloscope, for which reason such wording is marked thereon.

When the kit is not in use, all the vector loops 6, 6', etc. are placed within the storage space in the right hand half of the box. The cover 8 with its Sagittal plane mirror 9 is removed and slid along channel guides 7 to close said storage space, and tube 11 is hinged upwardly, to become parallel to mirror 5, after which the box may be closed by means of latches 14. The box is suitably provided with a handle 15 for carrying purposes.

When in use, the box is unlatched and opened, and the storage compartment cover 8 with its mirror 9 is placed in slot 10 so that the configuration shown in the drawing be assumed. One of the vector loops is then fitted in tube 11 as already described and the students may then observe the three projections of the loop in the horizontal, frontal and one of the Sagittal planes. The other Sagittal plane can be viewed by removing plate 8 and mirror 9 and fitting them as previously described in left hand slot 10'. The vector cardiographic loop 6' shown in the drawing represents a normal heart condition, whereas the other loops represent pathological conditions such as left ventricular hypertrophy (loop 6), right ventricular hypertrophy, and so on. The visual illustration of the four orthogonal projections readily permits comprehension by the students of the traces produced by electrocardiographs and vector-cardiographs.

It will readily be appreciated that the particular portable kit illustrated in the drawing is by no means the only possible embodiment of this invention. For example, the loop storage space could be closed by the lid 2 of the box itself, whereas the Sagittal plane mirror 9 could be suitably mounted on a plate of wood or the like, and received in a suitable opening specifically provided for this purpose in the side of the box so that it may be stored when out of use. In addition, it would also be possible to have a permanent demonstration unit which may even be considerably larger for use in lecture halls.

In such a case, various mirrors could be permanently mounted in their relevant positions for demonstration with the respective loops to the students. This and other alterations will be readily apparent, and it should therefore be understood that the present invention should be considered as limited only by the scope of the following claims.

I claim:

1. An apparatus for assisting the understanding of electrocardiography and vectorcardiography comprising first and second mirrors for placement in substantially horizontal and vertical planes representative, respectively, of the horizontal and frontal planes of electrode placement on a patient, said first horizontal mirror being marked with lines representing the leads of the principal horizontal electrodes on the patient's body, said lines emanating from a generally central point of said first mirror, and said second frontal plane mirror being marked with lines emanating from a generally central point of said second mirror and indicating the leads of the frontal plane electrodes on the patient's body; a series of standard three dimensional vector-cardiographic loops representative of normal and pathological heart conditions; a support portion on each said loop; and support means adapted for receiving said support portion of a selected one of said loops between said mirrors, substantially in a position in which an observer may view the reflection of the projection of said loop in either one of said first and second mirrors with the starting point of said loop coinciding with said central points of said mirrors.

2. Apparatus according to claim 1, in which there is provided a third mirror for placement in a plane orthogonal to said first and second mirrors, said plane being representative of the Sagittal plane to permit vision of the projection of said selected loop in said Sagittal plane.

3. Apparatus according to claim 1 or 2, in which said apparatus comprises a box having a box body and a lid hingedly connected thereto, said first and second mirrors being fixed, respectively, to said box body and said lid so as to become substantially normal to each other on opening said box.

4. Apparatus according to claim 3, further comprising a third mirror adapted to be stored in said box and means provided in said box permitting said third mirror to be mounted in orthogonal relation to said first and second mirrors when said box is open.

5. Apparatus according to claim 4, in which said box is provided with a storage space for said loops, said storage space being closed by said third mirror when said third mirror is stored in said box.

6. Apparatus according to claim 5, in which said storage space has an opening adjacent said first mirror, said storage space having two oppositve upper edges, provided with parallel guide means for receiving therebetween in sliding relation said third mirror.

7. Apparatus according to claim 6, in which said guide means are parallel to the hinge line defined between said box and said box lid.

8. Apparatus according to claim 7, in which said third mirror is mounted on a backing plate, said backing plate being received in said guide means, said two guide means each having a first end spaced from an adjacent edge of said first mirror by a distance substantially equal to the thickness of said backing plate to define a slot into which said backing plate may be fitted to mount said third mirror.

9. Apparatus according to claim 2, in which a first slot is defined in said box adjacent one lateral edge of said first horizontal mirror, said third Sagittal plane mirror being cooperable with said slot for vertical mounting thereof.

10. Apparatus according to claim 9, in which a second slot is defined in said box adjacent the opposite lateral edge of said first horizontal mirror, said third Sagittal plane mirror being corporable with said second slot for vertical mounting thereof.

11. Apparatus according to claim 3, in which said support means comprise a tube having a first end hingedly attached to said apparatus between said first and second mirrors for articulation of said tube in a plane containing said central points of said first and second mirrors, said tube having a second open free end for receiving said support portion of a selected one of said loops.

12. Apparatus according to claim 11, further including fixing means for fixing said support portion within said tube.

13. Apparatus according to claim 11, in which said support means is attached to said box lid.

* * * * *